United States Patent [19]

Ross

[11] 4,318,311
[45] Mar. 9, 1982

[54] CENTRIFUGALLY ACTUATED VALVE FOR TRANSMISSION

[75] Inventor: Phillip J. Ross, Brownsburg, Ind.

[73] Assignee: General Motors Corporation, Detroit, Mich.

[21] Appl. No.: 135,656

[22] Filed: Mar. 31, 1980

[51] Int. Cl.³ .................... G05D 13/10; F16D 25/12
[52] U.S. Cl. .................................. 74/752 C; 74/856; 192/103 FA; 192/104 F; 137/56
[58] Field of Search ............... 74/864, 859, 733, 856, 74/752 C; 192/3.31, 104 F, 103 FA; 137/56

[56] References Cited

U.S. PATENT DOCUMENTS 2,642,844  6/1953  Flinn.
3,556,271  1/1971  Hilpert .............................. 137/56
3,974,743  8/1976  Ivey.
4,082,012  4/1978  Schaefer et al..

Primary Examiner—Kenneth Dorner
Attorney, Agent, or Firm—Saul Schwartz

[57] ABSTRACT

In a transmission having input and output shafts drivingly connected by fluid pressure operated ratio establishing devices an improved centrifugally actuated valve is provided to disestablish the driving connection maximum angular velocity of the input shaft. The valve includes a sphere disposed in a stepped bore which sphere is spring biased to a closed position for normal operation and which shifts in response to centrifugal force to an open position in a fluid flow path thereby exhausting the drive establishing device and also being flushed of any contaminants.

4 Claims, 4 Drawing Figures

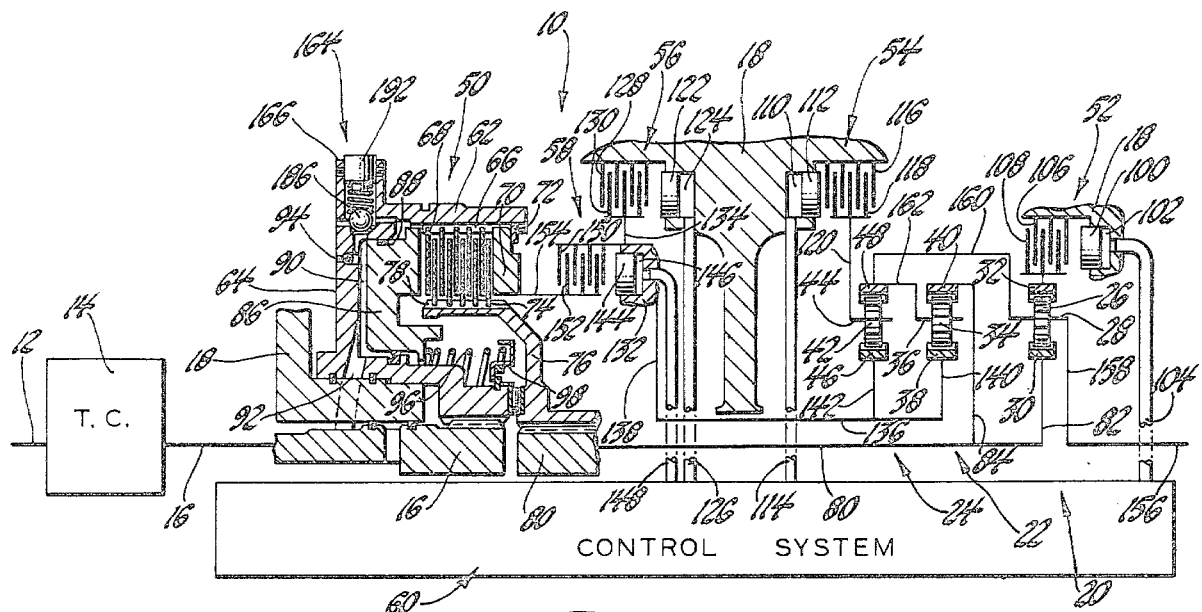
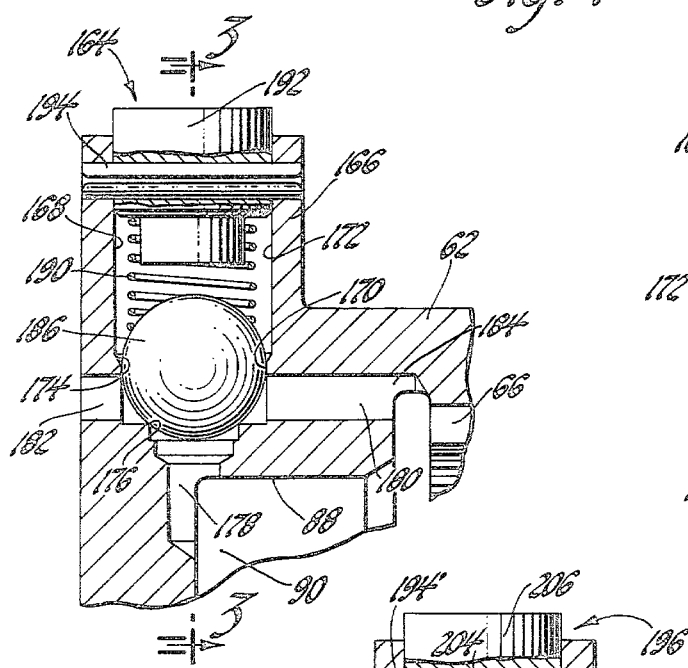
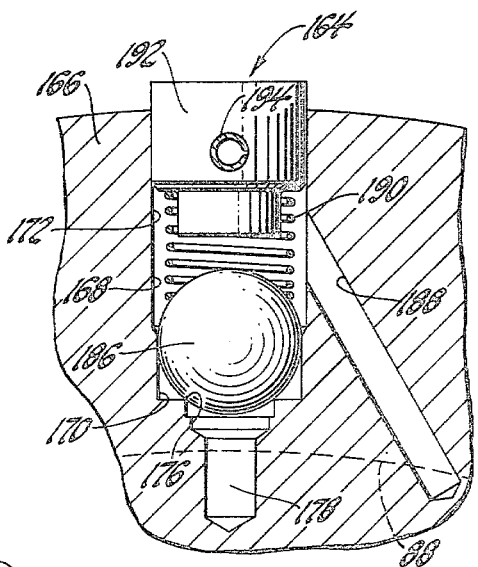
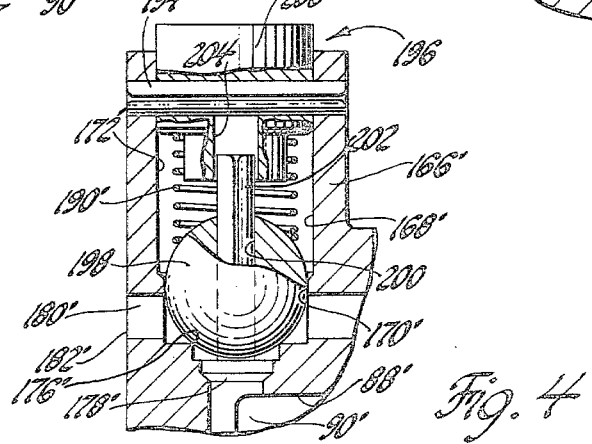

CENTRIFUGALLY ACTUATED VALVE FOR TRANSMISSION

FIELD OF THE INVENTION

This invention relates generally to vehicle transmissions having hydraulic controls and, more particularly, to an improvement in valving to disestablish driving connection through the transmission at maximum input shaft speed.

DESCRIPTION OF THE PRIOR ART

It has, in the past, been found desirable to provide means in vehicle transmissions to limit the capability of the units to transmit torque in certain situations. Typically, the limiting means function to disestablish the driving connection between input and output shafts of the transmission when the input shaft experiences an angular velocity in excess of a predetermined maximum. In transmissions having hydraulic controls and hydraulically operated ratio drive establishing devices such as clutches and brakes, one effective arrangement for disestablishing the driving connection has been to incorporate a centrifugally actuated valve sensitive to the angular velocity of the input shaft. The centrifugally actuated valve is closed in the normal speed range of the input shaft but opens under the influence of centrifugal force when the input shaft angular velocity exceeds a predetermined upper limit. In the open position, the valve functions to exhaust the pressure chamber of one of the drive establishing devices and thereby disestablish the driving connection between the input and output shafts. A valve according to this invention represents an improved centrifugally actuated valve for disestablishing the driving connection between transmission input and output shafts as described.

SUMMARY OF THE INVENTION

The primary feature of this invention is that it provides a transmission incorporating improved means for disestablishing driving connection between input and output shafts. Another feature of this invention is that it provides, in a transmission, an improved centrifugally actuated valve for exhausting a pressure chamber of a hydraulically actuated drive establishing device at a predetermined angular velocity of the transmission input shaft. Still another feature of this invention is that it provides an improved centrifugally actuated valve wherein pressurized fluid exhausted during an operative cycle of the valve functions to effectively flush contaminants from inside the valve. A still further feature of this invention resides in the provision of an improved centrifugally actuated valve including a ball disposed in a stepped bore in a rotating member, the ball normally being biased to a closed position in the small end of the bore wherein it closes a port which is exposed to pressure in a pressure chamber of a drive establishing device and moving to an open position in the large end of the bore when the angular velocity of the rotating member exceeds a maximum value thereby to permit the pressure chamber to exhaust and the out-flowing fluid to flow in the bore around the ball for contaminant flushing purposes.

These and other features of the invention will be readily apparent from the following specification and from the drawings wherein:

FIG. 1 is a schematic view of a transmission incorporating an improved centrifugally actuated valve according to this invention.

FIG. 2 is an enlarged view of a portion of FIG. 1 showing the improved centrifugally actuated valve according to this invention.

FIG. 3 is a sectional view taken generally along the plane indicated by lines 3—3 in FIG. 2, and FIG. 4 is similar to FIG. 2 but showing a modified embodiment of an improved centrifugally actuated valve according to this invention.

Referring now to FIG. 1 of the drawings, there is shown a generally conventional vehicle automatic transmission designated generally 10 incorporating an improved centrifugally actuated valve according to this invention. The details of the transmission 10, described generally hereinafter, are completely described in U.S. Pat. No. 3,691,872 issued Sept. 19, 1972 in the names of R. H. Schaefer and J. R. Fox and assigned to the assignee of this invention.

Referring again to FIG. 1, the transmission 10 is driven by an engine, not shown, through a shaft 12 which drives the pump of a conventional torque converter 14. The turbine of the torque converter drives a transmission input shaft 16 rotatably journaled in a housing 18 of the transmission 10. As is conventional, the housing 18 is attached to both the engine and a portion of the vehicle and is stationary relative to the internal moving components of the transmission.

The transmission 10 has a four-speed gear unit including a first planetary gear set 20, a second planetary gear set 22 and a third planetary gear set 24. The first planetary gear set includes a plurality of pinions 26 rotatably mounted on a carrier 28 and meshing with a sun gear 30 and a ring gear 32. The second planetary gear set 22 includes a plurality of pinions 34 rotatably supported on a carrier 36 and meshing with a sun gear 38 and a ring gear 40. The third planetary gear set 24 includes a plurality of planet gears 42 rotatably supported on a carrier 44 and meshing with a sun gear 46 and a ring gear 48.

Functioning with the planetary sets, the transmission 10 has a plurality of ratio drive establishing devices including a forward clutch 50, a first speed and reverse brake 52, a second speed brake 54, a third speed brake 56, and a fourth speed clutch 58. as more fully described hereinafter, the clutches and brakes are actuated by a control system designated generally 60 to provide four forward ratio drives, one reverse ratio drive and a neutral condition. The following chart lists the ratio drives available, including the neutral condition, and the available clutches and brakes with an X indicating which clutches and which brakes operate in each drive ratio.

|  | CLUTCH 50 | BRAKE 52 | BRAKE 54 | BRAKE 56 | CLUTCH 58 |
| --- | --- | --- | --- | --- | --- |
| REVERSE |  | X |  |  | X |
| NEUTRAL |  | X |  |  |  |
| FORWARD 1 | X | X |  |  |  |
| FORWARD 2 | X |  | X |  |  |
| FORWARD 3 | X |  |  | X |  |

-continued

|  | CLUTCH 50 | BRAKE 52 | BRAKE 54 | BRAKE 56 | CLUTCH 58 |
|---|---|---|---|---|---|
| FORWARD 4 | X |  |  |  | X |

The forward clutch 50 includes an input drum 62 rigidly connected to a hub 64 which is splined to input shaft 16 for rotation as a unit therewith inside the housing 18. The input drum 62 includes a plurality of axially extending input splines, only one spline 66 being shown in FIG. 1. A plurality of input clutch plates 68 are slidingly supported on the input splines and are retained on the input drum 62 by a backing plate 70 and retaining ring 72. A plurality of output clutch plates 74 are alternately spaced between the input clutch plates 68 and are slidingly disposed on a plurality of splines on a hub 76, only one spline 78 being shown in FIG. 1. The hub 76 is splined to a primary shaft 80 which, in turn, is rigidly connected to sun gear 30 by a hub 82 and to ring gear 40 by a hub 84.

With continuing reference to FIG. 1, the forward clutch 50 further includes an annular piston 86 slidably disposed in an annular cylinder 88 formed between the input drum 62 and the hub 64. The piston 86 cooperates with the cylinder 88 in defining an annular pressure chamber 90 adapted to be selectively pressurized with hydraulic fluid through an apply line 92. A conventional ball relief valve 94 is located in the hub 64. A spring 96 engages the piston 86 and a retainer 98 on the hub 64 and urges the piston toward a fully retracted position, shown in FIG. 1. When chamber 90 is pressurized, the piston 86 is urged from the retracted position against the force of spring 96, to an extended position, not shown, wherein the input and output clutch plates 68 and 74 are captured between the piston and the backing plate 70, the clutch 50 thereby rigidly connecting the input shaft 16 and the primary shaft 80. When the pressure in chamber 90 is relieved, the spring 96 forces the piston toward the retracted position while the fluid in chamber 90 is exhausted through the apply line 92 and through ball relief valve 94. In the retracted position of the piston 86 the driving connection between input shaft 16 and primary shaft 80 is disestablished.

Referring again to FIG. 1, the first speed and reverse brake 52, shown schematically, includes a piston 100 slidably disposed in a cylinder 102 in the housing 18. The cylinder is hydraulically pressurized through an apply line 104 connected to the control system 60. A plurality of fixed plates 106 are splined to the housing 18 and cooperate with a corresponding plurality of alternately spaced rotary plates 108 splined to the ring gear 32 of the first planetary set 20. Accordingly, when chamber 102 is pressurized, the piston 100 captures the plates 106 and the plates 108 thereby to ground or rigidly connect the ring gear 32 to the housing 18.

The second speed brake 54, shown schematically, similarly includes a cylinder 110 in housing 18 in which cylinder is slidably disposed a piston 112. The cylinder 110 is hydraulically pressurized through an apply line 114 connecting the cylinder to the control system 60. A plurality of fixed plates 116 are splined to the housing 18 and a plurality of rotary plates 118 are rigidly attached to the carrier 44 of the third planetary set 24 by means of a hub 120. Accordingly, when the cylinder 110 is pressurized the piston 112 captures the rotary plates 118 and the fixed plates 116 thereby to ground or rigidly connect the carrier 44 to the housing 18.

The third speed brake 56, shown schematically, includes a piston 122 slidably disposed in a cylinder 124 in the housing 18. The cylinder 124 is hydraulically pressurized through an apply line 126 connected to the control system 60. A plurality of fixed plates 128 are splined to the housing 18 and cooperate with an alternately spaced plurality of rotary plates 130 rigidly connected to an output drum 132 by a hub 134. As more fully described hereinafter, the output drum 132 is rotatably supported on the housing 18 and when the cylinder 124 is hydraulically pressurized the piston 122 captures the fixed plates 128 and rotary plates 130 to ground or rigidly connect the output drum 132 to the housing 18.

The output drum 132 is part of the fourth speed clutch 58 and is rigidly attached to a secondary transmission shaft 136 by means of a hub 138. The secondary shaft 136 is rigidly connected to the sun gear 38 of the second planetary set 22 by a hub 140 and to the sun gear 46 of the third planetary set 24 by a hub 142. The fourth speed clutch 58 further includes a piston 144 slidably disposed in a cylinder 146 in the output drum 132, the cylinder being hydraulically pressurized through an apply line 148 connected to control system 60. A plurality of output plates 150 are splined to the output drum 132 and cooperate with a corresponding plurality of alternately spaced input plates 152 splined on a drum 154 which is a rigid extension of the backing plate 70 on the input drum 62 of the forward clutch 50. The input plates 152 thus rotate as a unit with the input drum 62 and, when the cylinder 146 is hydraulically pressurized, the piston 144 captures the output plates 150 and the input plates 152 to rigidly connect the input drum 62 and the output drum 132.

The torque output of transmission 10 is through an output shaft 156 rigidly connected to the carrier 28 of the first planetary set 20 by means of a hub 158. The carrier 28 is, in turn, rigidly connected to the ring gear 48 of the third planetary set by means of a drum 160. Completing the gearing, the ring gear 48 of the third planetary set is rigidly connected to the carrier 36 of the second planetary set by a drum 162.

With reference to FIG. 1 and the preceding table, it is seen that forward clutch 50 is operational in all forward ratio drives to transfer torque from the input shaft 16 to the primary shaft 80 of the transmission. In first ratio drive, first speed and reverse brake 52 is operational to ground ring gear 32 to provide a gear reduction through the first planetary set 20. In second ratio drive, first speed and reverse brake 52 is released and second speed brake 54 is activated to ground the carrier 44 of the third planetary set 24. In known manner, then, second ratio drive is effected through the second and third planetary sets 22 and 24. For third ratio drive, brake 54 is released and third speed brake 56 is engaged to ground the output drum 132 and, consequently, the sun gears 38 and 46 of the second and third planetary sets, respectively. Accordingly, gear reduction is again effected by the second and third planetary sets 22 and 24. Finally, fourth speed ratio drive is effected by releasing brake 56 and applying fourth speed clutch 58 which then provides rigid connection between the primary shaft 80 and the secondary shaft 136 so that two members, ring gear 40 and sun gear 38, of the second planetary set are rigidly connected. This, of course, produces 1:1 ratio drive through the planetary set which is then transmitted to the output shaft 156 through carrier 36, drum 162, ring gear 48, drum 160, carrier 28 and hub 158.

Referring particularly now to FIGS. 1, 2 and 3, it is seen that whenever the transmission controls provide any forward ratio drive and an input is experienced at the output shaft 156, the input shaft 16 will be driven at a speed no less than the speed of the shaft 156 and at a higher speed in all but fourth speed ratio drive. In this situation the driving connection between input shaft 16 and output shaft 156 is disestablished at a preselected angular velocity of the input shaft by an improved centrifugally actuated valve according to this invention and designated generally 164. The valve 164 is disposed in a flange 166 integral with the drum 62 and includes a stepped cylindrical bore 168 oriented on an axis perpendicular to the axis of rotation of drum 62. The bore 168 includes a first or small circular cross section portion 170 and a second or large circular cross section portion 172 connected to the small circular cross section portion by a shoulder 174. A circular port 176 connects the pressure chamber 90 of the forward clutch 50 with the base of the bore 168 through a passage 178. A cross bore 180 intersects the first portion 170 of the bore 168 above the port 176. In addition, the cross bore 180 intersects the outer surface of hub 64 at an opening 182 and the area adjacent the splines 66 at an opening 184 which is outside the cylinder 88. Hydraulic fluid exiting chamber 90 through openings 182 and 184 drains back to the transmission sump.

Referring again to FIGS. 2 and 3, the valve 164 further includes a ball 186 having a diameter substantially equal to the diameter of first portion 170 of the bore 168. The ball 186 is shiftable in the bore 168 between a closed position disposed in first portion 170 and seated on port 176 and an open position, not shown, spaced vertically from the closed position and completely within the second portion 172. The second portion 172 of the bore 168 is in communication with the pressure chamber 90 by means of an angle bore 188 which intersects the bore 168 above the ball 186 when the latter is in the closed position. A spring 190 is disposed in the bore 168 and seats at one end against the ball 186 and at the other end against a plug 192 which closes the outboard end of the bore 168 and which is retained in the flange 166 by a pin 194.

Describing now the operation of the valve 164, the spring 190 continuously biases the ball 186 toward the closed position seated on port 176. In this position, communication between chamber 90 and the cross bore 180 through the port 176 is prevented. Similarly, communication from the chamber 90 through the angled bore 188 and bore 168 to the cross bore 180 is prevented by virtual sealing engagement between the diameter of ball 186 and the first portion 170 of the bore 168. In neutral or reverse ratio drives, the chamber 90 is exhausted while the drum 62 and hub 64 rotate as a unit with the input shaft 16 to provide an input to clutch 58 during reverse drive. Spring 190, however, maintains ball 186 in the closed position. As soon as the control system is conditioned for any of the forward ratio drives, pressurized hydraulic fluid is introduced into the chamber 90 through apply line 92 to actuate the forward clutch 50 as described hereinbefore. Simultaneously, fluid pressure is exerted on the ball 186 from below in proportion to the area exposed above port 176. In addition, the ball 186 is also exposed to pressure from above in proportion to the area exposed above first portion 170 of the bore 168. Since the area exposed above the first portion 170 exceeds the area exposed above the port 176, a net fluid pressure biasing force toward the closed position is experienced by the ball 186 which pressure, in addition to the force of spring 190, tends to maintain the ball in the closed position.

In all forward ratio drives, the fluid pressure in chamber 90 and the spring 190 cooperate in maintaining the ball 186 in the closed position for all angular velocities of input shaft 16 up to a predetermined maximum. When the maximum angular velocity is exceeded, the centrifugal force exerted on the ball 186 overcomes the spring 168 and the fluid pressure biasing force to move the ball from the closed position to the open position in the second portion 172 of the bore 168. As the ball 186 lifts from the port 176 and moves into the second portion 172, pressurized fluid flows from the chamber 90 through the passage 178 to the cross bore 180 and out through the openings 182 and 184 to the sump. Similarly, pressurized fluid flows from the chamber 90 through the angled bore 188 into the bore 168 and around the ball 186 to the first portion 170 and into the cross bore 180. The pressurized fluid in chamber 90 in thus exhausted to disengage the forward clutch 50. The ball 186 will remain in the open position until the angular velocity of the input shaft 16 and drum 62 slows to a predetermined value below maximum, at which time the spring 190 will reseat the ball 186 on port 176 for another operational cycle. The flow of pressurized fluid around ball 186 in the open position from the angled bore 188 to the cross bore 180 provides the important benefit of flushing any contaminants that may become lodged in the bore 168.

Referring now to FIG. 4, a modified embodiment of the centrifugally actuated valve of this invention is shown and designated generally 196. For simplicity, elements of structure identical to the elements shown and described in FIGS. 2 and 3 are identified in FIG. 4 by corresponding primed numbers. Modified valve 196 includes a ball 198 substantially of the same diameter as first portion 170' of the stepped bore 168'. The ball 198 has a through bore 200 disposed along the longitudinal axis of the bore 168'. A hollow pin 202 is received in the bore 200 in the ball and moves with the ball while providing communication through the ball from the passage 178' to the portion of the bore 168' above the ball. The pin 202 is loosely received in a corresponding guide bore 204 in a plug 206 which closes the outboard end of bore 168'. The plug is retained in the bore by pin 194'.

The modified valve 196 functions as described with respect to valve 164 except for the path by which fluid pressure is communicated to bore 168' above ball 198. In modified valve 196 chamber 90' communicates with bore 168' above the ball through hollow pin 202 and between the pin and guide bore 204. In the normal speed range of input shaft 16 the ball 198 is maintained in the closed position by spring 190' and the net bias pressure on the ball in the closing direction. When maximum angular velocity is reached, centrifugal force lifts ball 198 off of port 176' to permit fluid to escape to cross bore 180'. At the same time, pressure induces fluid flow through hollow pin 202, between the pin and guide bore 204 and into bore 168' from which it flows around ball 198 and out through cross bore 180'. The chamber 90' is thus exhausted and driving connection between the input shaft and the output shaft is disestablished.

The embodiments of the invention in which an exclusive property or privilege is claimed are defined as follows:

1. In a transmission having an input shaft rotatable about a first axis of said transmission, an output shaft, a fluid pressure actuated ratio drive establishing device operative to drivingly connect said input and said output shafts and including valve support means rotatable about said first axis at an angular velocity proportional to the angular velocity of said input shaft, a source of pressurized fluid and means for selectively introducing said pressurized fluid to said drive establishing device, the improvement comprising, means on said valve support means defining a bore disposed on a second axis substantially perpendicular to said first axis and having a first cross section and an expanded second cross section in juxtaposition with and larger than said first cross section, first fluid port means communicating between said first cross section of said bore and said ratio establishing device, second fluid port means communicating between said first cross section of said bore and a fluid exhaust, third fluid port means communicating between said second cross section of said bore and said ratio establishing device, a valve member disposed in said bore for centrifugal force induced bodily shiftable movement along said second axis during rotation of said valve support means from a closed position in said first cross section of said bore to an open position in said second cross section of said bore, and seal means on said valve member and on said bore operative in the closed position of said valve member to prevent communication between either of said first and said third fluid port means and said second fluid port means and in said open position to permit communication between both of said first and said third port means and said second port means thereby to exhaust said ratio establishing device and disestablish driving connection between said input and said output shafts, said valve member in the open position thereof cooperating with said second cross section of said bore to provide clearance between said valve member and said bore so that pressurized fluid flowing from said third port means to said second port means flows around said valve member.

2. In a transmission having an input shaft rotatable about a first axis of said transmission, an output shaft, a fluid pressure actuated ratio drive establishing device operative to drivingly connect said input and said output shafts and including a drum member rotatable as a unit with said input shaft about said first axis, a source of pressurized fluid, and means for selectively introducing said pressurized fluid to said drive establishing device, the improvement comprising, means on said drum member defining a stepped cylindrical bore disposed on a second axis substantially perpendicular to said first axis and having a first circular cross section and a second circular cross section in juxtaposition with and larger than said first cross circular section, first fluid port means communicating between said first circular cross section of said bore and said ratio establishing device, second fluid port means communicating between said first circular cross section of said bore and a fluid exhaust, third fluid port means communicating between said second circular cross section of said bore and said ratio establishing device, a spherical valve member disposed in said bore for centrifugal force induced bodily shiftable movement along said second axis during rotation of said drum means from a closed position in said first circular cross section of said bore to an open position in said second circular cross section of said bore, and seal means on said spherical valve member and on said bore operative in the closed position of said spherical valve member to prevent communication between either of said first and said third fluid port means and said second fluid port means and in said open position to permit communication between both of said first and said third port means and said second port means thereby to exhaust said ratio establishing device and disestablish driving connection between said input and said output shafts, said spherical valve member having a diameter smaller than the diameter of said second circular cross section so that in said open position of said valve member clearance exists between said spherical valve member and said bore and pressurized fluid flowing from said third port means to said second port means flows around said spherical valve member.

3. The improvement recited in claim 2 further including spring means between said drum member and said spherical valve member biasing said spherical valve member to said closed position so that centrifugal force induced bodily shiftable movement of said spherical valve member to said open position takes place at an angular velocity of said drum member proportional to the force exerted by said spring means.

4. In a transmission having an input shaft rotatable about a first axis of said transmission, an output shaft, a fluid pressure actuated ratio drive establishing device including a drum member rotatable as a unit with said input shaft about said first axis and defining a cylinder and a piston slidably disposed in said cylinder for movement between a disengaged position wherein driving connection between said input and said output shafts is disestablished and an engaged position drivingly connecting said input and said output shafts in response to admission of pressurized fluid to a pressure chamber defined between said piston and said cylinder, said transmission further including a source of pressurized fluid, and means for selectively introducing said pressurized fluid to said pressure chamber, the improvement comprising, means on said drum member defining a stepped cylindrical bore disposed on a second axis substantially perpendicular to said first axis and having a first circular cross section and a second circular cross section in juxtaposition with and larger than said first cross circular section, a first fluid passage between said pressure chamber and said stepped cylindrical bore intersecting said bore at the base thereof and defining a circular port having a diameter smaller than the diameter of said first circular cross section, means on said drum member defining a cross bore communicating between said first circular cross section of said stepped cylindrical bore and a fluid exhaust, a spherical valve member having a diameter substantially equal to the diameter of said first circular cross section disposed in said stepped cylindrical bore for centrifugal force induced bodily shiftable movement between a closed position seated on said circular port and sealingly engaging said first circular cross section and an open position in said second circular cross section, said spherical valve member in said closed position preventing communication between said first fluid passage and said cross bore and preventing communication between said second circular cross section of said stepped cylindrical bore and said cross bore and in said open position permitting communication between said pressure chamber and said cross bore thereby to exhaust said pressure chamber and disestablish driving connection between said input shaft and said output shaft, spring means disposed between said spherical valve member and said drum member biasing said spherical valve member to said closed position so that centrifugal force induced bodily shiftable movement of said spherical valve member to said open position takes place at an angular velocity of said drum member proportional to the force exerted by said spring means, and means defining a second fluid passage between said pressure chamber and said second circular cross section of said stepped cylindrical bore so that in said closed position of said spherical valve member fluid pressure from said pressure chamber exerts a net force on said spherical valve member toward said closed position and in said open position of said spherical valve member pressurized fluid flowing from said second fluid passage to said cross bore flows around said spherical valve member.

* * * * *